(12) United States Patent
Baldwinson et al.

(10) Patent No.: US 7,259,931 B2
(45) Date of Patent: Aug. 21, 2007

(54) SLIDER DESIGN FOR HIGH FLY WRITE IMMUNITY

(75) Inventors: Michael Baldwinson, San Jose, CA (US); David Rutherford, San Jose, CA (US)

(73) Assignee: Matsushita Electrical Industrial Co., Ltd., Osaka (JP)

( * ) Notice: Subject to any disclaimer, the term of this patent is extended or adjusted under 35 U.S.C. 154(b) by 196 days.

(21) Appl. No.: 11/108,329

(22) Filed: Apr. 18, 2005

(65) Prior Publication Data

US 2006/0232873 A1    Oct. 19, 2006

(51) Int. Cl.
*G11B 21/02*    (2006.01)

(52) U.S. Cl. ........................................................ 360/75

(58) Field of Classification Search ................. 360/75, 360/25, 135, 235.7, 235.6; 714/47
See application file for complete search history.

(56) References Cited

U.S. PATENT DOCUMENTS

| | | | |
|---|---|---|---|
| 5,909,330 A | 6/1999 | Carlson et al. | |
| 6,563,673 B2 * | 5/2003 | Mundt et al. | 360/135 |
| 6,574,754 B1 * | 6/2003 | Smith | 714/47 |
| 6,678,102 B1 | 1/2004 | Liikanen et al. | |
| 6,989,671 B2 * | 1/2006 | Zhu et al. | 324/212 |
| 7,019,945 B1 * | 3/2006 | Peng et al. | 360/235.7 |
| 7,023,664 B2 * | 4/2006 | Crone et al. | 360/235.7 |
| 7,085,092 B2 * | 8/2006 | Koganezawa | 360/75 |
| 7,099,114 B2 * | 8/2006 | Kang | 360/235.6 |
| 2004/0082277 A1 * | 4/2004 | Smith | 451/41 |
| 2005/0174665 A1 * | 8/2005 | Zhang et al. | 360/25 |
| 2005/0219725 A1 * | 10/2005 | Ozanoglu et al. | 360/25 |
| 2005/0264913 A1 * | 12/2005 | Ruiz | 360/75 |

* cited by examiner

*Primary Examiner*—Fred F. Tzeng
(74) *Attorney, Agent, or Firm*—Fliesler Meyer LLP

(57) ABSTRACT

An embodiment of a slider in accordance with the present invention for use in a hard disk drive having a rotatable disk can include a plurality of rails arranged across a surface of the slider such that an air bearing is formed when the slider is positioned over the disk and the disk is rotated such that the slider traverse a servo wedge of the disk. The surface of the slider further includes a trailing pad arranged near a trailing edge of the surface of the slider such that when the slider traverses debris having a height higher than minimum height, the air bearing increases such that the slider is not in communicative proximity with the disk for a time at least as long as a time for the slider to traverse the servo wedge.

11 Claims, 13 Drawing Sheets

SLIDER DESIGN FOR HIGH FLY WRITE IMMUNITY

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

CROSS REFERENCE TO RELATED APPLICATIONS

This U.S. Patent Application incorporates by reference all of the following co-pending applications:

U.S. patent application Ser. No. 11/095,060 entitled "Scanning Tracks from a Media Base on a Slider Load Position," by Zayas, filed Mar. 31, 2005.

U.S. Pat. No. 7,095,580 entitled "Methods to Determine Gross and Fine Positioning on a Reference Surface of a Media," by Richard M. Ehrlich et al., filed Dec. 10, 2003.

U.S. patent application Ser. No. 10/872,062 entitled "Method for Optimizing Dynamic Stroke in the Self Servo-Write Process," by Calfee, et al., filed Jun. 18, 2004.

U.S. patent application Ser. No. 10/872,824 entitled "Dynamic Stroke Optimizing in the Self Servo-Write Process," by Calfee, et al., filed Jun. 18, 2004.

U.S. Pat. No. 7,177,111 entitled "System and Method for Optimizing Track Spacing Across a Stroke," by Gururangan, et al., filed Dec. 30, 2004.

TECHNICAL FIELD

The present invention relates to rotatable media data storage devices, as for example optical or magnetic hard disk drive technology.

BACKGROUND

A hard disk drive typically contains one or more disks clamped to a rotatable spindle motor, at least one head for reading data from and/or writing data to the surfaces of each disk, and an actuator utilizing linear or rotary motion for positioning the head(s) over selected data tracks on the disk(s). The actuator positions the read/write head over the surface of the disk as the spindle motor rotates and spins the disk. An air bearing forms between the read/write head and the disk surface so that the read/write head follows the contours of the disk without impinging on the disk surface.

Contamination may be introduced to the recording medium via a number of sources. For example, oil can leak from a bearing or moving parts can collide to form debris left on the disk surface. As the read/write head traverses the disk surface, it can potentially collide with the debris or the debris can collect on the underside of the slider, potentially leading to writing and/or reading errors. Where an error is detected, a hard disk drive can often perform corrective steps to ensure that data is not lost or contaminated.

SUMMARY

In one aspect, the invention includes a method of detecting a high fly write transient in a hard disk drive having an actuator a slider operably associated with the actuator, a head associated with the slider, and a rotatable disk. The method comprises arranging one of the slider and a servo pattern of the rotatable disk such that a time over which the head exceeds a threshold head separation during an error event approximates or exceeds a servo wedge sample rate, positioning the slider in communicative proximity with the disk, rotating the disk such that a head separation forms between the slider and the disk, monitoring a signal from a servo wedge, and detecting a variance in the signal beyond a threshold.

In another aspect, the invention includes a slider for use in a hard disk drive having an actuator with which the slider is associated, a head associated with the slider, and a rotatable disk having a servo wedge. The slider comprises a plurality of features includes a plurality of pads arranged across a surface of the slider and a trailing pad arranged near a trailing edge of the surface of the slider. The plurality of features is arranged across a surface of the slider such that head separation is achieved when the slider is positioned over the disk and the disk is rotated such that the slider traverse the servo wedge. The plurality of features are arranged such that when the slider traverses debris having a height higher than a minimum height, the head separation increases such that the slider is not in communicative proximity with the disk for a time at least as long as a time for the slider to traverse the servo wedge.

In still another aspect, the invention includes a rotatable disk for use in a hard disk drive having an actuator, a slider operably associated with the actuator, and a head associated with the slider. The rotatable disk comprises a plurality of servo wedges arranged across a surface of the disk such that an air bearing is formed when the slider is positioned over the disk and the disk is rotated such that the slider traverse the plurality of servo wedges. The plurality of servo wedges are arranged across the surface of the disk such that when the slider traverses debris having a height higher than a minimum height, the air bearing increases such that the slider is not in communicative proximity with the disk for a time at least as long as a time for the slider to traverse the servo wedge.

In a still further aspect, the invention includes a slider for use in a hard disk drive having an actuator with which the slider is associated, a head associated with the slider, and a rotatable disk having a servo wedge. The slider comprises a plurality of pads arranged across a surface of the slider so that head separation occurs when the slider is positioned over the disk and the disk is rotated, and a trailing pad arranged near a trailing edge of the surface of the slider. One or both of the plurality of pads and the trailing pad are arranged such that debris is deflected away from said trailing pad.

BRIEF DESCRIPTION OF THE FIGURES

Further details of embodiments of the present invention are explained with the help of the attached drawings in which.

DETAILED DESCRIPTION

Figure 1:
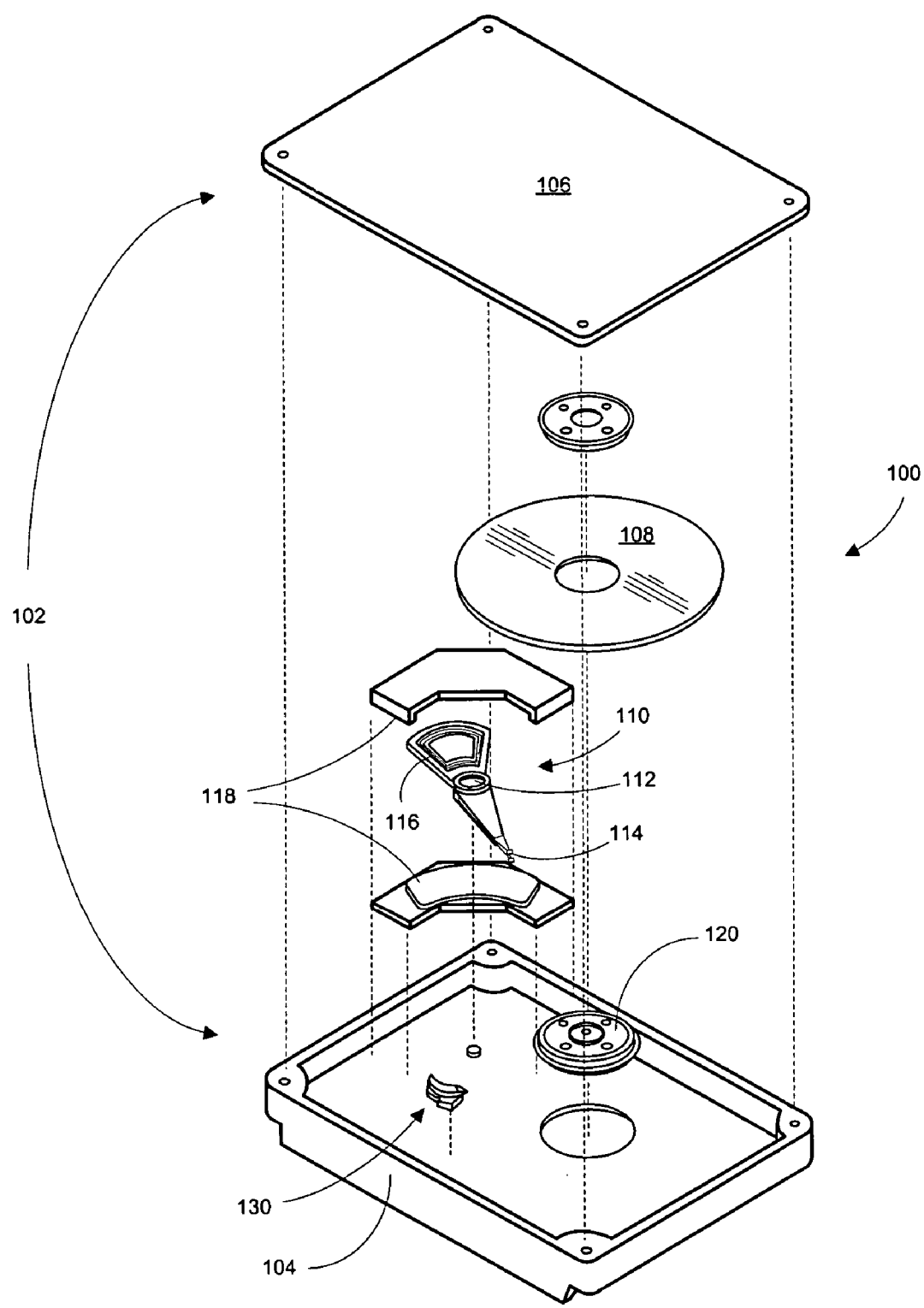
FIG. 1 is an exploded view of an exemplary hard disk drive for use with embodiments of sliders and methods for reading the surface of the disk in accordance with the present invention.

FIG. 1 is an exploded view of an exemplary hard disk drive (HDD) 100 for applying an embodiment of a method in accordance with the present invention. The HDD 100 includes a housing 102 comprising a housing base 104 and a housing cover 106. The housing base 104 illustrated is a base casting, but in other embodiments a housing base 104 can comprise separate components assembled prior to, or during assembly of the HDD 100. A rotatable spindle 120 is associated with the housing base 104. A disk 108 is fixedly connected with the rotatable spindle 120, for example by clamping. The disk 108 can be made of a light aluminum alloy, ceramic/glass or other suitable substrate, with magnetizable material deposited on one or both sides of the disk 108. The magnetic layer has tiny domains of magnetization for storing data transferred through heads 114. In an embodiment, the head 114 is a magnetic transducer adapted to read data from and write data to the disk 108. The disk 108 can be rotated at a constant or varying rate typically ranging from less than 3,600 to more than 15,000 RPM (speeds of 4,200 and 5,400 RPM are common in hard disk drives designed for mobile devices such as laptop computers). The invention described herein is equally applicable to devices having any number of disks attached to the spindle 120. In other embodiments, the head 114 includes a separate read element and write element. For example, the separate read element can be a magneto-resistive head, also known as a MR head. It will be understood that multiple head 114 configurations can be used. It will be understood that systems and methods in accordance with the present invention can be applied to rotatable media data storage devices having alternative head 122 configurations and utilizing alternative read and/or write technologies.

The head 114 is operably associated with a rotary actuator 110 that can sweep an arc between an inner diameter (ID) of the disk 108 and an outer diameter (OD) of the disk 108 and/or a ramp 130 positioned near the OD. Upper and lower magnet return plates 118 and at least one magnet that together form the stationary portion of a voice coil motor (VCM). A voice coil 116 is mounted to the rotary actuator 110 and positioned in an air gap of the VCM. The rotary actuator 110 pivots about a bearing 112 when current is passed through the voice coil 116 and pivots in an opposite direction when the current is reversed, allowing for precise positioning of the head 114 along the radius of the disk 108. Each side of a disk 108 can have an associated head 114, and the heads 114 are collectively coupled to the rotary actuator 110 such that the heads 114 pivot in unison. The invention described herein is equally applicable to devices wherein the individual heads separately move some small distance relative to the actuator. This technology is referred to as dual-stage actuation (DSA).

Figure 2A:
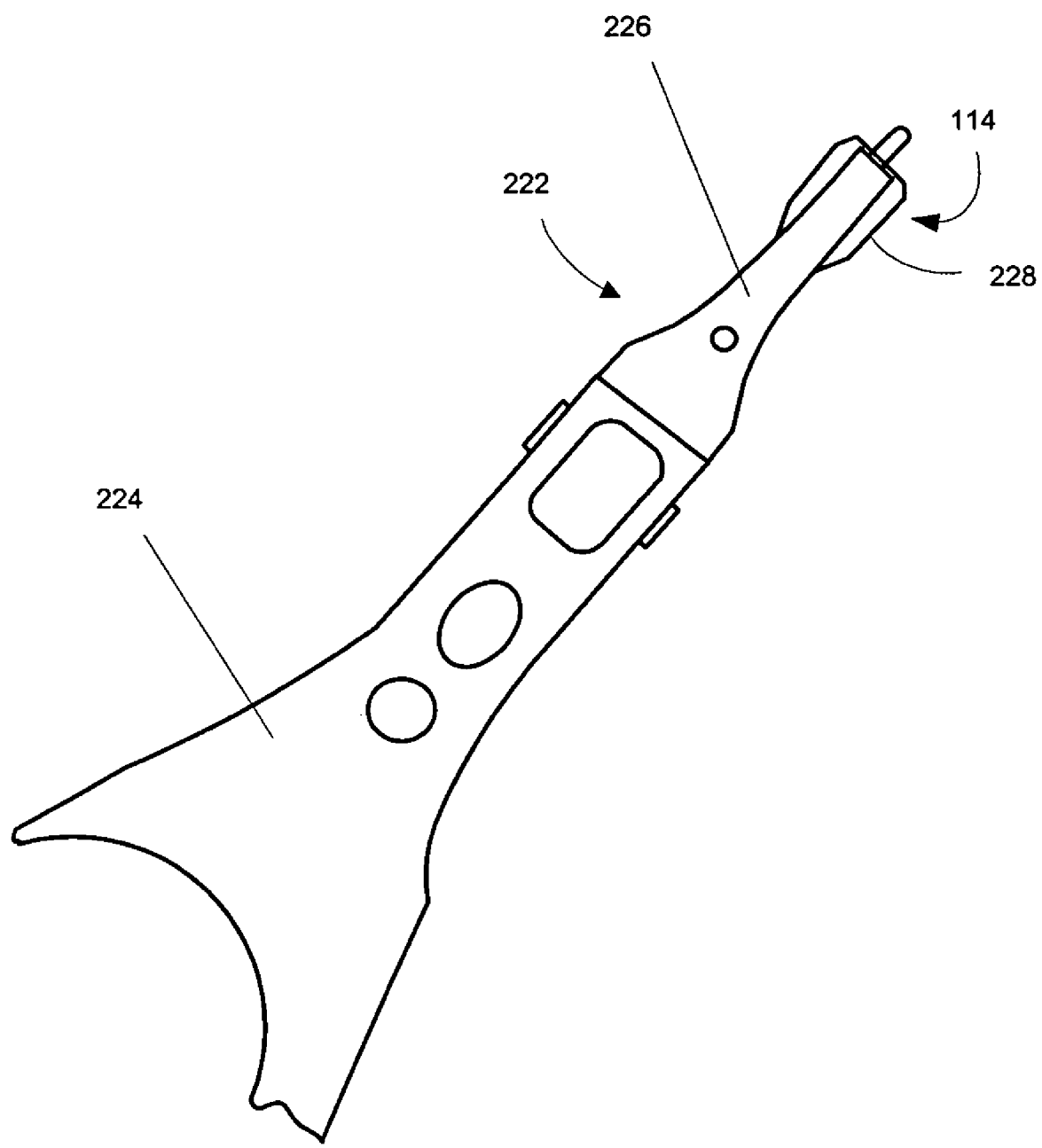
FIG. 2A is a close-up view of a head suspension assembly used in the hard disk drive of FIG. 1 showing a head, a slider and a suspension.

Referring to FIG. 2A, a subassembly commonly referred to as a head suspension assembly (HSA) 222 is associated with the rotary actuator 110, and comprises the head 114 formed on a slider 228, which is further connected with a flexible suspension member (a suspension) 226. The suspension 226 can be connected with an arm 224 which in one embodiment can be either integrally formed with a mount for a bearing 112 or separately attached to the mount. The head 114 is comprised of an electromagnetic read/write transducer which writes and reads user data on the disk 108. The head 114 can be formed on the slider 228 using a number of different techniques, for example the head 114 and slider 228 can be manufactured on a single die using semiconductor processing (e.g. photolithography and reactive ion etching). Spinning of the disk(s) 108 increases air pressure beneath the slider 228, creating a thin air bearing that lifts the slider 228 (and consequently the head 114) off of the surface of the disk 108. A nano-gap of significantly less than one micro-inch can be maintained between the disk 108 and the head 114 in one embodiment. The suspension 226 can be bent or shaped to act as a spring such that a force is applied to the disk 108 surface. The air bearing resists the spring force applied by the suspension 226, and the opposition of the spring force and the air bearing to one another allows the head 114 to trace the surface contour of the rotating disk 108 (which is likely to have minute warpage) without "crashing" against the disk 108 surface. As is well understood by those of ordinary skill in the art, not all heads ride an air bearing as described above. When a head 114 "crashes," the head 114 collides with the disk 108 surface such that the head 114 and/or the disk 108 surface may be damaged.

Figure 2B:
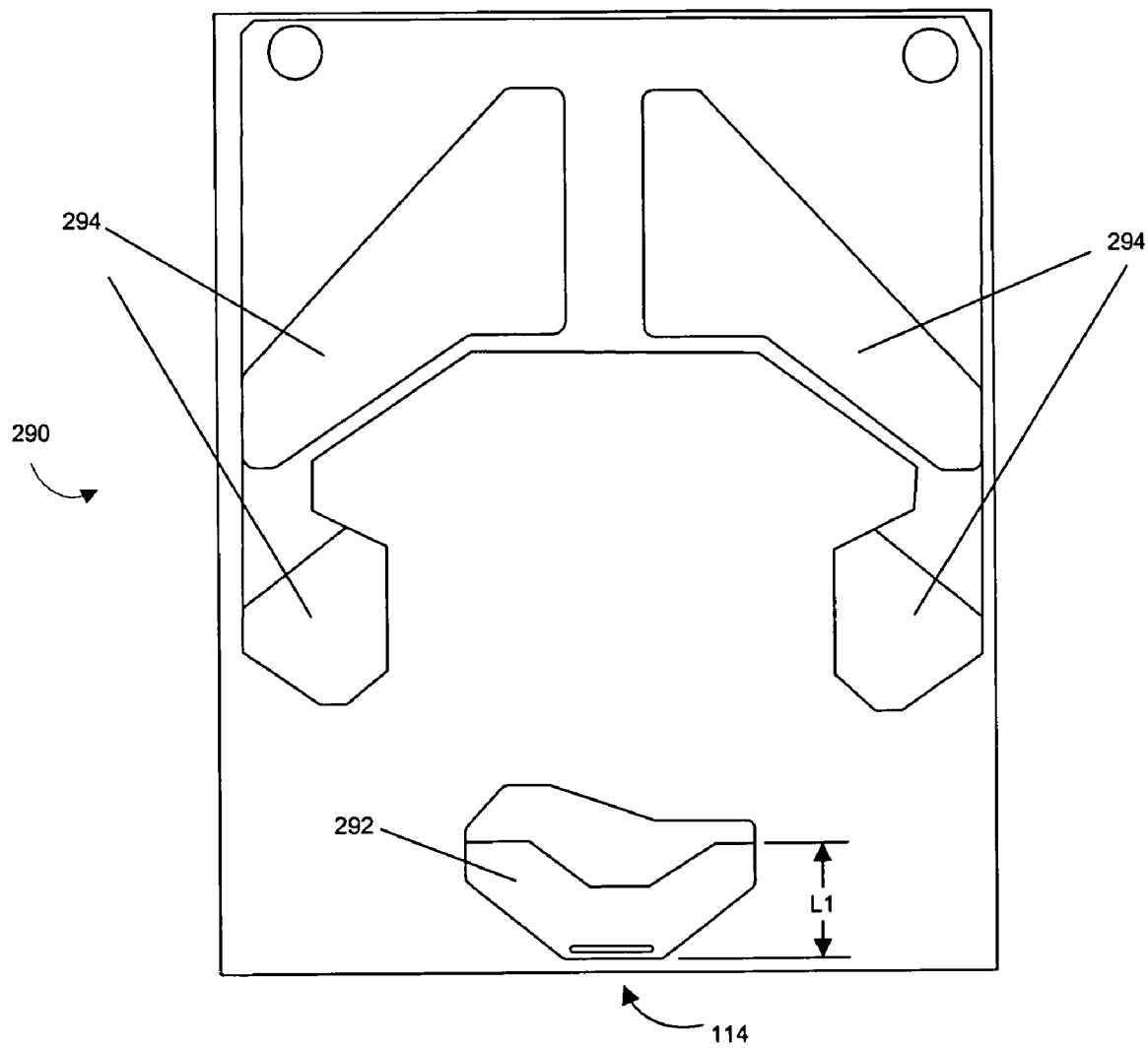
FIG. 2B is a close-up view of an air bearing surface of an exemplary slider in accordance with the prior art.
Figure 2C:
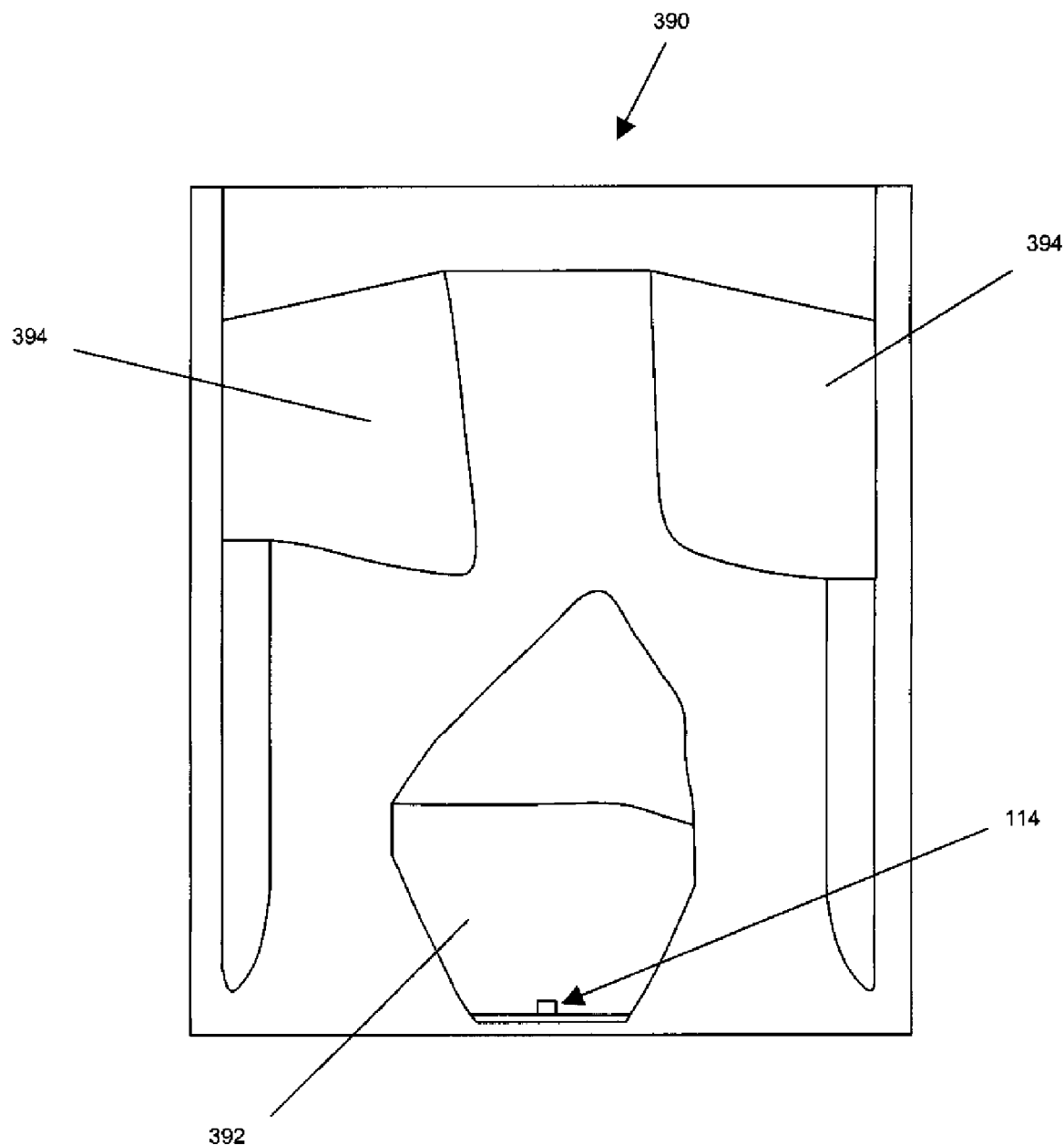
FIG. 2C is a reverse perspective view of an air bearing surface of still another exemplary slider in accordance with the prior art.

FIG. 2B illustrates an exemplary air bearing surface (ABS) 290 of a slider 228 for use with a head suspension assembly 222 of the prior art. The ABS 290 as shown generally includes two important features, a leading pad 294 being continuous or discontinuous and having a leading edge that extends toward the trailing edge along the sides of the ABS to form a roughly U shape, and a trailing pad 292 arranged near the trailing edge of the ABS 290. The trailing pad 292 includes the electromagnetic transducer positioned at the trailing edge of the trailing pad 292. The ABS features 292,294 help produce a desired air pressure profile across the ABS 290 such that a desired fly height of the slider 228 is achieved. FIG. 2C illustrates an alternative exemplary air bearing surface (ABS) 390 of the slider 228 for use with the head suspension assembly 222 of the prior art. As above, the ABS 390 includes a trailing pad 392 on which the head 114 is connected, the trailing pad 392 being arranged near a trailing edge of the ABS 390. The head 114 includes a read element and a write element. The ABS 390 as shown further includes two pads 394 arranged near the edges of the ABS 390. While the ABS 390 of FIG. 2C is different from that of FIG. 2B, both geometries of the prior art include trailing pads 392 having surfaces capable of accumulating debris.

Figure 3:
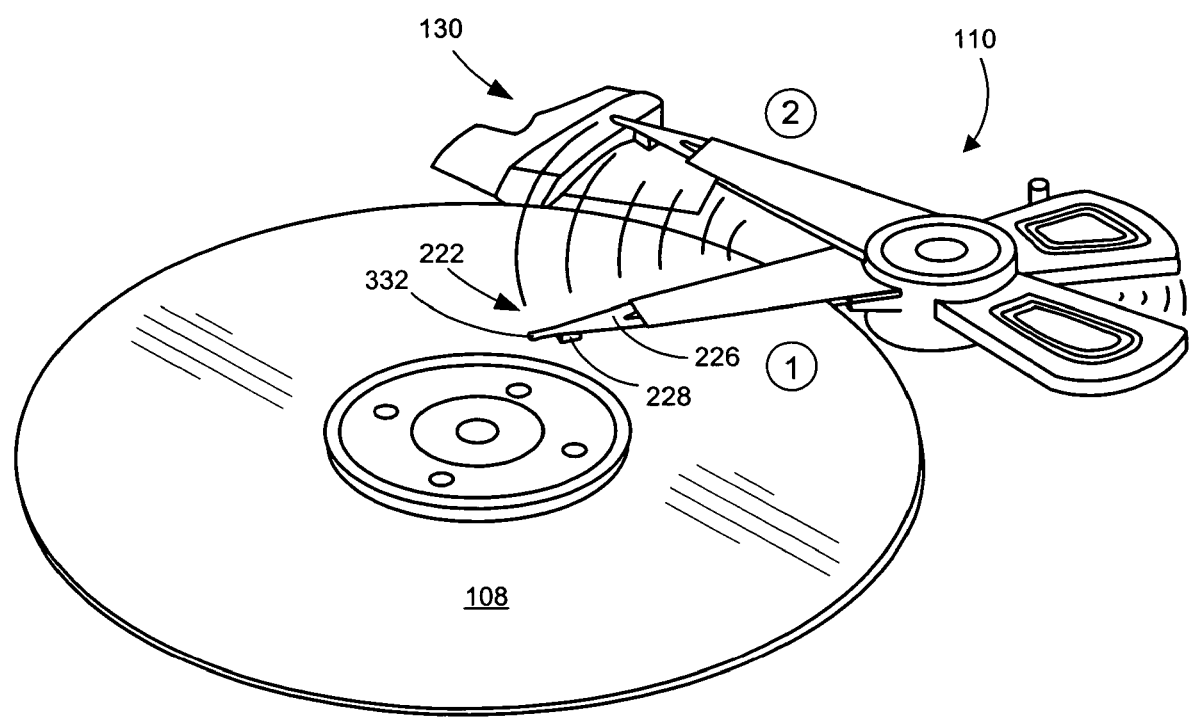
FIG. 3 is a perspective view of the motion of the rotary actuator of FIG. 1 unloading the slider from the disk.

Refinements in disk fabrication have enabled manufacturers to produce disks 108 having ultra-smooth surfaces. Use of a disk 108 having an ultra-smooth surface can introduce a potential failure mechanism wherein meniscus and adhesion forces between the slider 228 and the ultra-smooth surface can cause the slider 228 to stick to the surface. Thus, when the hard disk drive 100 is not in use and rotation of the disks 108 is slowed and stopped (i.e., the disks 108 are "spun down"), the heads 114 can be removed from close proximity to the disk 108 surface by positioning the suspension 226 on a ramp 130 located either adjacent to the disk 108 or just over the disk 108 surface. The slider 228 should be unloaded from the disk 108 before the air bearing between the slider 228 and the disk 108 collapses. FIG. 3 illustrates motion of the actuator 110 as the slider 228 is unloaded from the disk 108 and as the suspension 226 is driven up the ramp 130. The actuator 110 pivots from location 1, where the slider 228 is positioned over the disk 108 surface, to location 2, where the slider 228 is positioned adjacent to the disk 108. The range of motion of the actuator 130 is commonly referred to as the stroke of the actuator 110. The slider 228 is removed from close proximity with the disk 108 by pivoting the actuator 110 such that a lift tab 332 extending from the suspension 226 contacts the ramp surface and slides up the ramp 130. The position along the ramp 130 where the lift tab 332 first contacts the ramp 130 can be called the touch-point. As the lift tab 332 slides up the ramp 130 from the touch-point, the ramp 130 opposes the spring force of the suspension 226 and forces the slider 228 (and the head 114) away from the disk 108 surface. The HSA 222 can continue its motion along the stroke by traveling up the grade portion of the ramp 130 to a substantially flat portion that optionally can include a detent for cradling the lift tab 332. The head 114 can be loaded back onto the disk 120 after the disk spins up to a safe speed. In other embodiments, the suspension 226 contacts the ramp 130 at a location along the suspension 226 between the head 114 and the pivot point. Unloading the head 114 from the disk 108 prevents sticking, and further provides resistance to damage from non-operating shock by suspending the head 114 over a significantly wide gap between the head 114 and an opposing head or surface, rather than placing the head 114 in close proximity to the rigid disk 108 surface.

Figure 4:
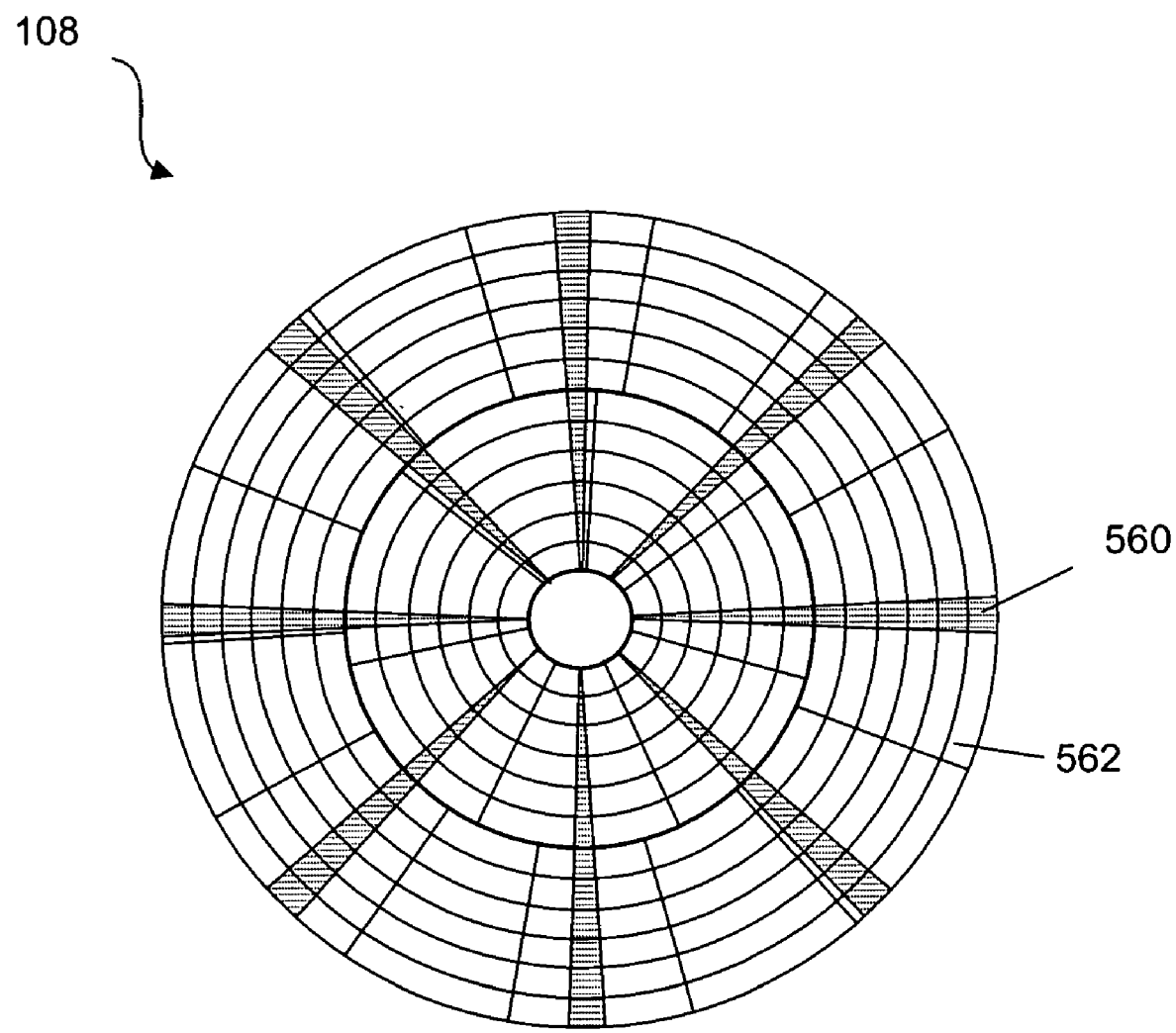
FIG. 4 is a diagram showing an example of a data and servo format for a disk in the drive of FIG. 1.

The information stored on a disk 108 can be written in concentric tracks, extending from near the ID to near the OD, as shown in the exemplary disk of FIG. 4. In an embedded servo-type system, servo information can be written in servo wedges 560, and can be recorded on tracks 562 that can also contain data. Data tracks written to the disk surface can be formatted in radial zones. Radial zones radiating outward from the ID can be written at progressively increased data frequencies to take advantage of an increase in linear velocity of the disk surface directly under the head 114 in the respective radial zones. Increasing the data frequencies increases the data stored on the disk surface over a disk formatted at a fixed frequency limited at the ID by a circumference of a track at the ID. In a system where the actuator arm rotates about a pivot point such as a bearing, the servo wedges may not extend linearly from the ID to the OD, but may be curved slightly in order to adjust for the trajectory of the head 114 as it sweeps across the disk 108.

Figure 5:
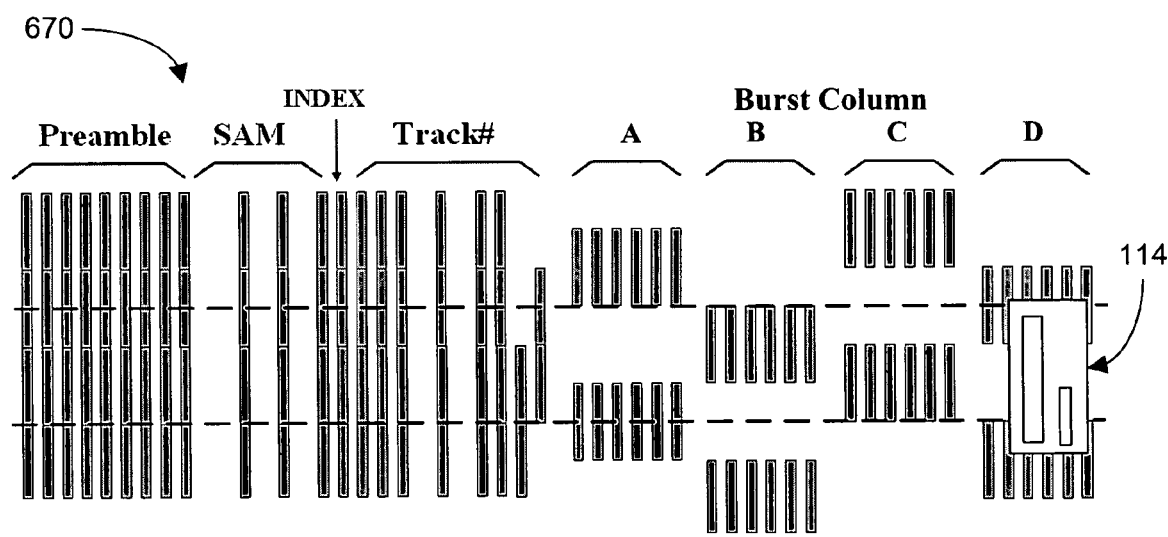
FIG. 5 is a partial detailed view of a servo wedge on the disk of FIG. 5 showing a four-burst pattern with a R/W head positioned near one of the servo bursts.

FIG. 5 illustrates a portion of a servo pattern 670 within a servo wedge 560. The servo pattern 670 includes information stored as regions of magnetization. For example, where the servo pattern 670 is longitudinally magnetized, grey blocks are magnetized to the left and white spaces are magnetized to the right, or vice-versa. Alternatively, where the servo pattern 670 is perpendicularly magnetized, grey blocks are magnetized up (i.e., out of the page in the figure) and white spaces are magnetized down (i.e., into the page in the figure), or vice-versa. Servo patterns 670 contained in each servo wedge are read by the head 114 as the surface of the spinning disk 108 passes under the head 114. The servo patterns 670 can include information identifying a data field. For example, the servo pattern 670 can include a preamble, a servo address mark (SAM), an index field, track identification, servo bursts, etc. The exemplary final servo pattern is a simplification of a typical servo pattern. The servo information can be arranged in any order, and can include many more transition pairs than are illustrated (for example, the region containing track identification is truncated as shown, and commonly includes many more transition pairs than are illustrated). Further, additional information, such as partial or complete wedge number information, can be included in the final servo pattern. One of ordinary skill in the art can appreciate the myriad different arrangements of information that can be contained in a servo pattern. Systems and methods in accordance with embodiments of the present invention should not be construed as being limited in scope to those examples provided herein.

Figure 6:
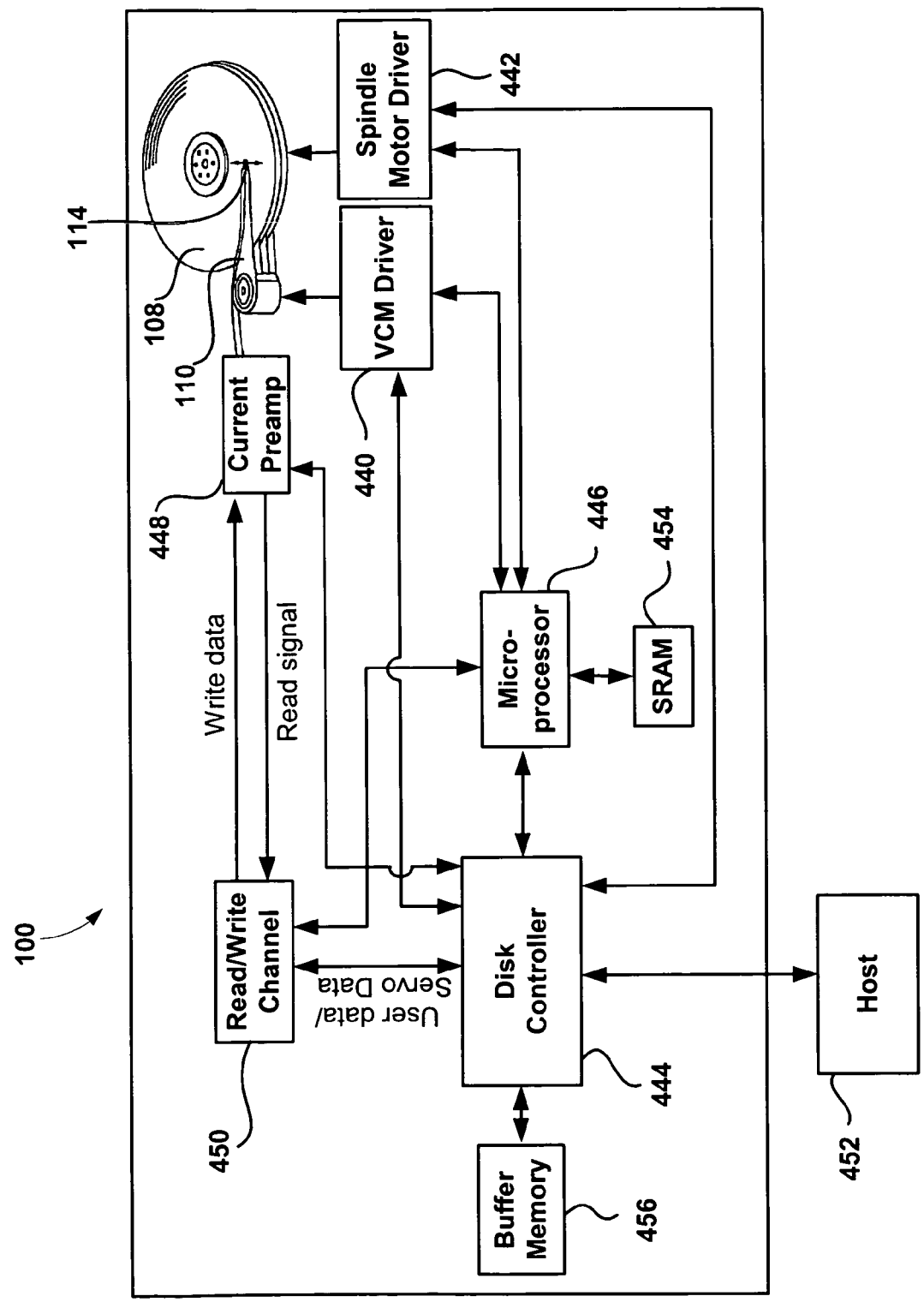
FIG. 6 is a control schematic of the exemplary hard disk drive of FIG. 1.

FIG. 6 is a control schematic for the exemplary HDD 100. A servo system for positioning the head 114 can comprise a microprocessor 446 and a servo controller, the servo controller existing as circuitry within the hard disk drive 100 or as an algorithm resident in the microprocessor 446, or as a combination thereof. In other embodiments, an independent servo controller can be used. The servo system uses positioning data read by the head 114 from the disk 108 to determine the position of the head 114 over the disk 108. When the servo system receives a command to position a head 114 over a track, the servo system determines an appropriate current to drive through the voice coil 116 and commands a VCM driver 440 electrically connected with the voice coil 116 to drive the current. The servo system can further include a spindle motor driver 442 to drive current through the spindle motor 120 and rotate the disk(s) 108, and a disk controller 444 for sending information to and receiving information from a host 452 and for controlling multiple disk functions. The host 452 can be any device, apparatus, or system capable of utilizing the hard disk drive 100, such as a personal computer, Web server, or consumer electronics device. An interface controller can be included for communicating with the host 452, or the interface controller can be included in the disk controller 444. In other embodiments, the servo controller, VCM driver 440, and spindle motor driver 442 can be integrated into a single application specific integrated circuit (ASIC). One of ordinary skill in the art can appreciate the different means for controlling the spindle motor 120 and the VCM.

A flexible circuit (not shown) is connected with the rotary actuator 110 to supply current to the voice coil 116 and to provide electrical connections to the heads 114, allowing write signals to be provided to each head 114 and allowing electrical signals generated during reading to be delivered to pre-amp 448. Commonly, the flexible circuit comprises a polyimide film carrying conductive circuit traces connected at a stationary end and at a moving end to the rotary actuator 110. The disk controller 444 provides user data to a read/write channel 450, which sends signals to the pre-amp 448 to be written to the disk(s) 108. The disk controller 444 can also send servo signals to the microprocessor 446. The disk controller 444 can include a memory controller for interfacing with buffer memory 456. In an embodiment, the buffer memory 456 can be dynamic random access memory (DRAM). The microprocessor 446 can include integrated memory, or the microprocessor 446 can be electrically connected with external memory (for example, static random access memory (SRAM) 454 or alternatively DRAM).

As an example of the operation of the HDD 100, in response to a digital signal from the host 452 to write data to the disk 108, the read/write channel 450 processes the signal obtained from the host 452 by the disk controller 444 and sends the processed digital signal to the preamp 448 which converts it to a variable write current signal that is delivered to the head 114. The rotary actuator 110 positions the head 114 above the target track 562. In particular, the VCM urges the rotary actuator 110 to position the head 114 above the target track 562. The VCM is responsive to a servo control signal from the microprocessor 446. During a read operation, the disk controller 444 can receive a request from the host 452 for information stored on the disk 108. The microprocessor 446 is notified of the data request via the disk controller 444 and actuates the VCM to position the head 114 over the target track 562. After the head 114 is in position, data from the track 562 is read by the transducer head 114 and the resulting signal is passed to the read/write channel 450. The read/write channel 450 receives the analog read signal provided by the head 114 and the pre-amp 448, and converts that signal into a digital signal that can be understood by the host 452.

Figure 7:
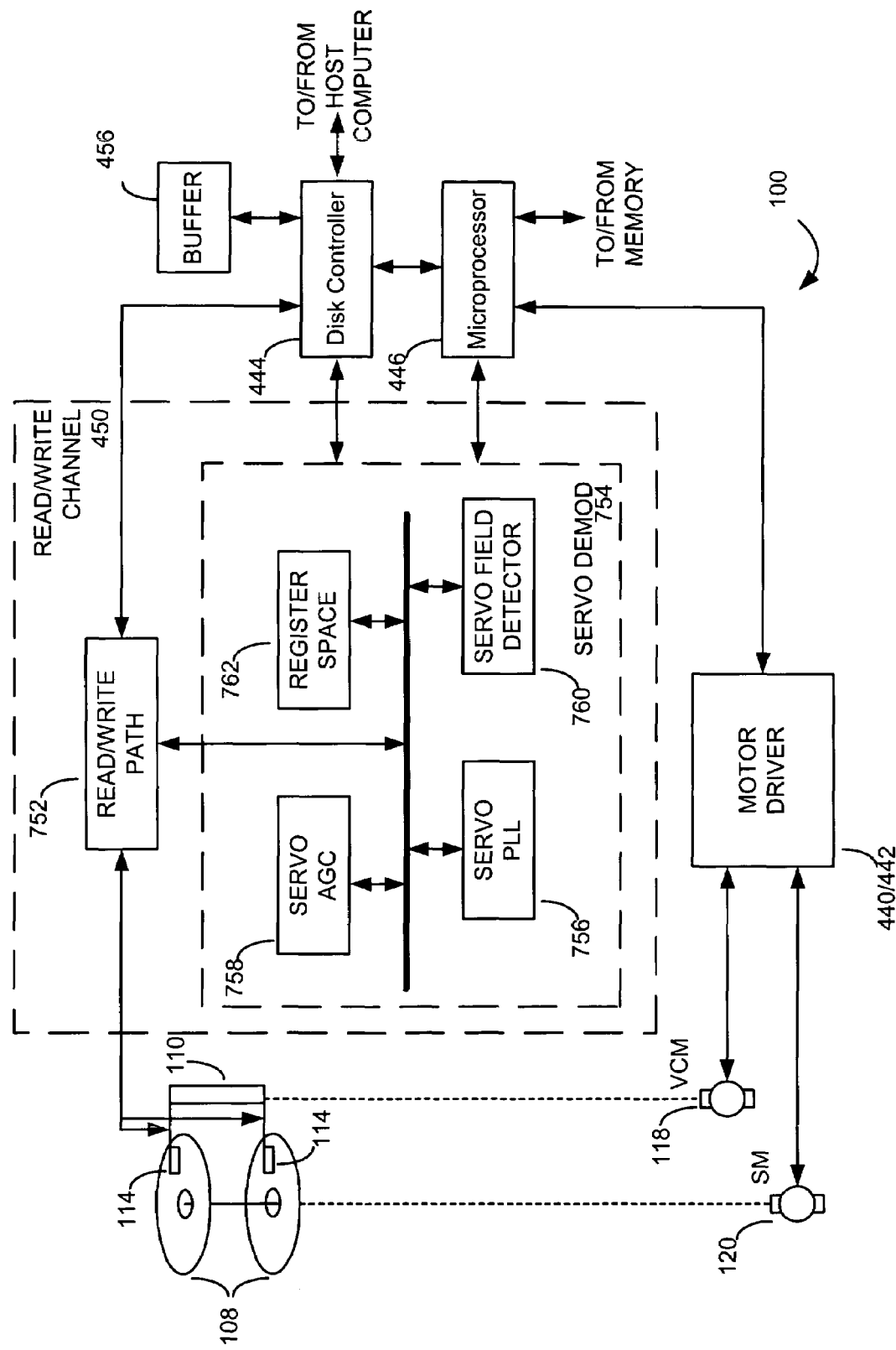
FIG. 7 is a more detailed schematic of automatic gain control (AGC) circuitry for use with the exemplary hard disk drive of FIG. 1.

Referring to FIG. 7, an exemplary read/write channel 450 is shown as including a read/write path 752 and a servo demodulator 754. The read/write path 752, which can be used to read and write user data and servo data, may include front end circuitry useful for servo demodulation. The read/write path 752 may also be used for writing servo information in self-servowriting. One of ordinary skill in the art will appreciate that the HDD 100 includes additional components, which are not shown because they are not necessary to explain the embodiments of the present invention.

The servo demodulator 754 is shown as including a servo phase locked loop (PLL) 756, a servo automatic gain control (AGC) 758, a servo field detector 760 and register space 762. The servo PLL 756, in general, is a control loop that is used to provide frequency and phase control for the one or more timing or clock circuits (not specifically shown in FIG. 7), within the servo demodulator 754. For example, the servo PLL 756 can provide timing signals to the read/write path 752. The servo AGC 758, which includes (or drives) a variable gain amplifier (VGA), is used to keep the output of the read/write path 752 at a substantially constant level when servo wedges 560 on one of the disks 108 are being read. The servo field detector 760 is used to detect and/or demodulate the various subfields of the servo wedges 560, including the SAM, wedge number, track number and servo bursts. The microprocessor 446 is shown as being separate from the servo demodulator 754. However, because the microprocessor 446 is used to perform various servo demodulation functions (e.g., decisions, comparisons, characterization and the like), the microprocessor 446 can be thought of as being part of the servo demodulator 754, or the servo demodulator 754 can have its own microprocessor.

Referring again to FIG. 5, preamble fields extend across the disk 108 radially, from the ID to the OD. The preamble fields can extend across the disk 108 in continuous lines, though not necessarily. Generally, a preamble field contains a signal of a calibrated strength. As the head 114 passes over the preamble field, the strength of the signal through the read/write channel 450 is monitored by the servo AGC 758. The signal strength is used by the AGC to adjust the gain (via the servo VGA) imparted to signals read by the head 114. Generally, at least after an initial adjustment to the gain of the read/write channel 450 has been made, adjustments to the amount of gain are made gradually. Adjustments are made because the amplitude of a single preamble field cannot be precisely controlled. The amplitude of the preamble can vary from head to head, from one radial location to another, and it can vary with the flying height of the head 114 at any time. The preamble fields extend radially across the disk 108 and are pieced together, and intersections between separately written portions of the preamble field can vary in the strength of the magnetic transitions written to the disk 108.

Contamination in an HDD 100 can collect on the slider 228, including on features of the ABS 290 approximately perpendicular to the direction of relative motion. Such features can be areas of low pressure (e.g., trailing edges, cavities). Contamination on the slider 228 can continue to collect and increase in size until the contamination is detached as a result of forces applied to the slider 228 during operation. Contamination can be forced between the trailing pad 292 of the ABS 290 and the disk 108 potentially resulting in momentarily increased magnetic separation between the write element and the disk 108. Such a transient change in spacing during a write operation can cause what is commonly referred to as a high fly write (HFW). An HFW occurrence can result in a data recovery error if the write element cannot properly record magnetic transitions because of the increased separation. It should be noted that high fly reads (HFR) can occur as well; however, if data that is improperly (or not at all) read is properly written to the disk, after repeated attempts to read the data it is likely that the debris on the surface of the disk or contamination on the slider 228 (or some other source of the HFR event) will be removed by forces acting on the disk and/or the slider, and that a read will be successful. If the data was written while the head was flying too high (the definition of a high fly write), however, it may not be possible to read the data back properly.

The characteristic time constant of an HFW is dictated by two primary factors: the size and material properties of the contamination trapped between the disk 108 and the ABS 290, and the length of the lowest flying contact pad which contains the read and write elements. It is possible to detect an HFW by measuring and analyzing one or more readings from a servo wedge. For example, the servo VGA or position error burst amplitude at each servo wedge can be measured, analyzed and compared to expected levels. If the amplitude of the VGA setting is above a threshold (indicating a low amplitude signal) or the amplitude of the position error bursts is below the expected value, then the HDD 100 can be signaled to enter a write-safe mode. (For some other measured and analyzed feature of the servo wedge, some other trigger will signal the HDD 100 to enter the write-safe mode.) The write-safe mode can include verifying all writes for a pre-determined period of time predicated on no reoccurrences of the write-safe signal and/or performing a head cleaning operation that can include loading and unloading the slider 228 to and from the disk 108, high acceleration seeks, and/or other functions that require movement of the actuator 110 intended to cause detachment of contamination.

However, in order for an HFW to be detected, the transient must occur at least partially over a servo wedge, where the servo VGA and plurality of servo bursts can be measured, for example. HFW transient separation times have been measured and analyzed. The minimum separation travel distance have been found, for at least one ABS 290 scheme, to be approximately 500 microns. Such a minimum separation travel distance is typically smaller than a distance between servo wedges, therefore reducing the probability that time extent of a transient will include a servo wedge.

Figure 8:
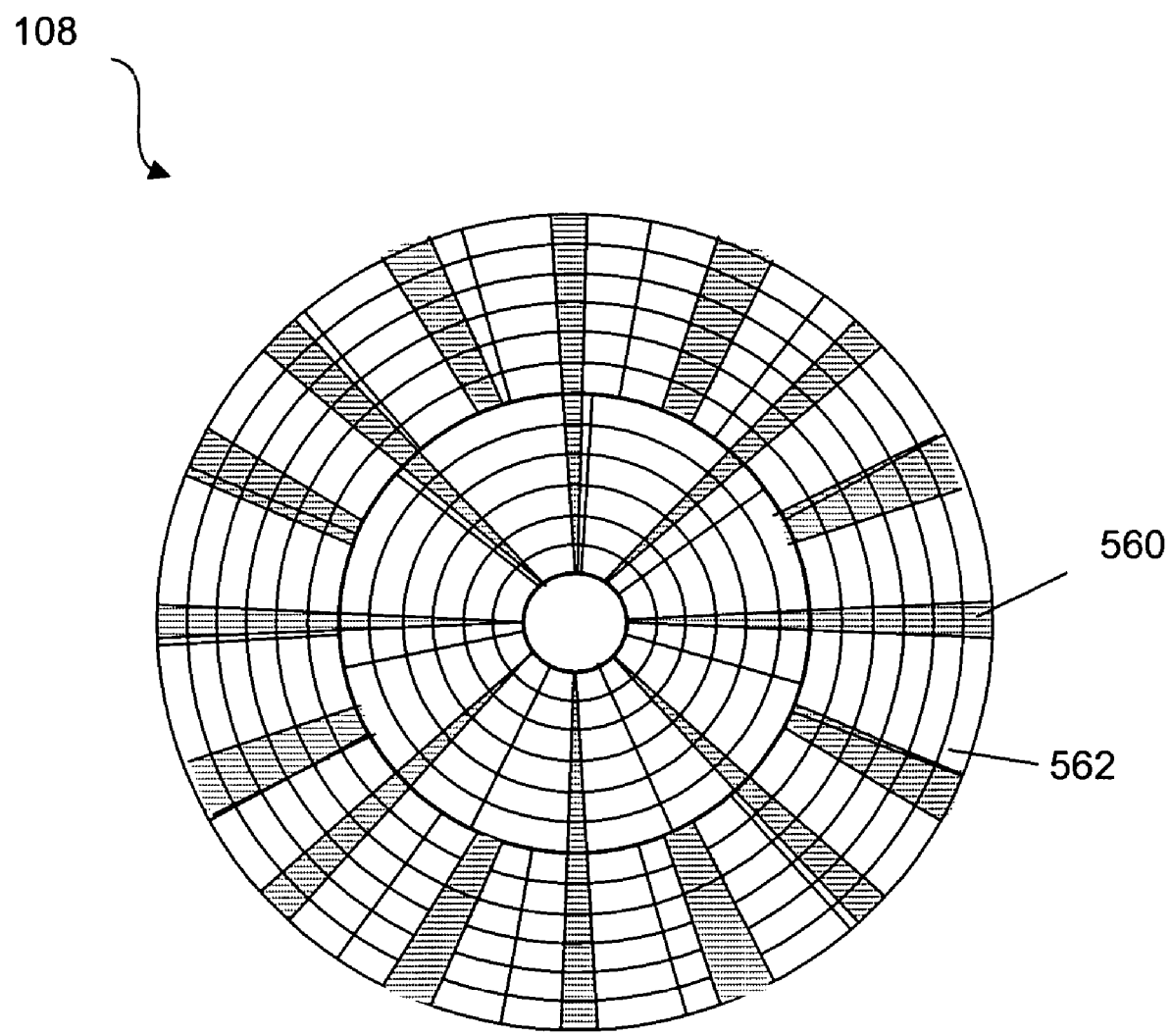
FIG. 8 is a diagram showing an embodiment of a data and servo format for a disk in accordance with the present invention.

Embodiments of systems in accordance with the present invention can include a disk 108 having a final servo pattern 670 with servo wedges 560 arranged circumferentially about the disk 108 so that a distance between servo wedges 560 is such that the desired probability of detection is achieved. By decreasing the distance between the servo wedges 560 the servo sampling rate is increased, increasing the probability that an HFW will traverse the servo wedge 560. In an embodiment, the servo sampling rate can be increased such that the HFW transient separation time is substantially similar to (or slightly greater than) the time between samples. In such an embodiment, the slider can be virtually assured of traversing a servo wedge during an HFW, thereby triggering a write-safe signal. For example, in the example given above of a minimum separation travel distance of 500 microns, the servo wedges 560 can be arranged so that the servo VGA portions of the servo wedges 560 are 500 microns apart. In other embodiments, the servo sampling rate can be increased as desired to increase the probability that an HFW will traverse the servo wedge 560. As will be understood, such schemes can result in a decrease in surface area allocated for user data. As such, in still further embodiments of systems in accordance with the present invention can include disks 108 having a final servo pattern 670 with a servo wedge 560 distribution that varies across the data stroke. Referring to FIG. 8, the servo sampling rate can be increased along portions of the disk surface where contamination is likely to be likewise increased (e.g., near a ramp load location of the slider, as shown in FIG. 8). By increasing the servo sampling rate near the OD, this scheme also reduces the maximum linear distance between servo wedges 560 without suffering as much of an increase in servo wedge 560 overhead as would be suffered if the servo sample rate were increased over the entire stroke. Thus, for a given HFW transient distance, having a higher servo sampling rate near the OD is a more efficient way to ensure that most (if not all) HFW events will be detected by observation of the VGA settings.

Figure 9A:
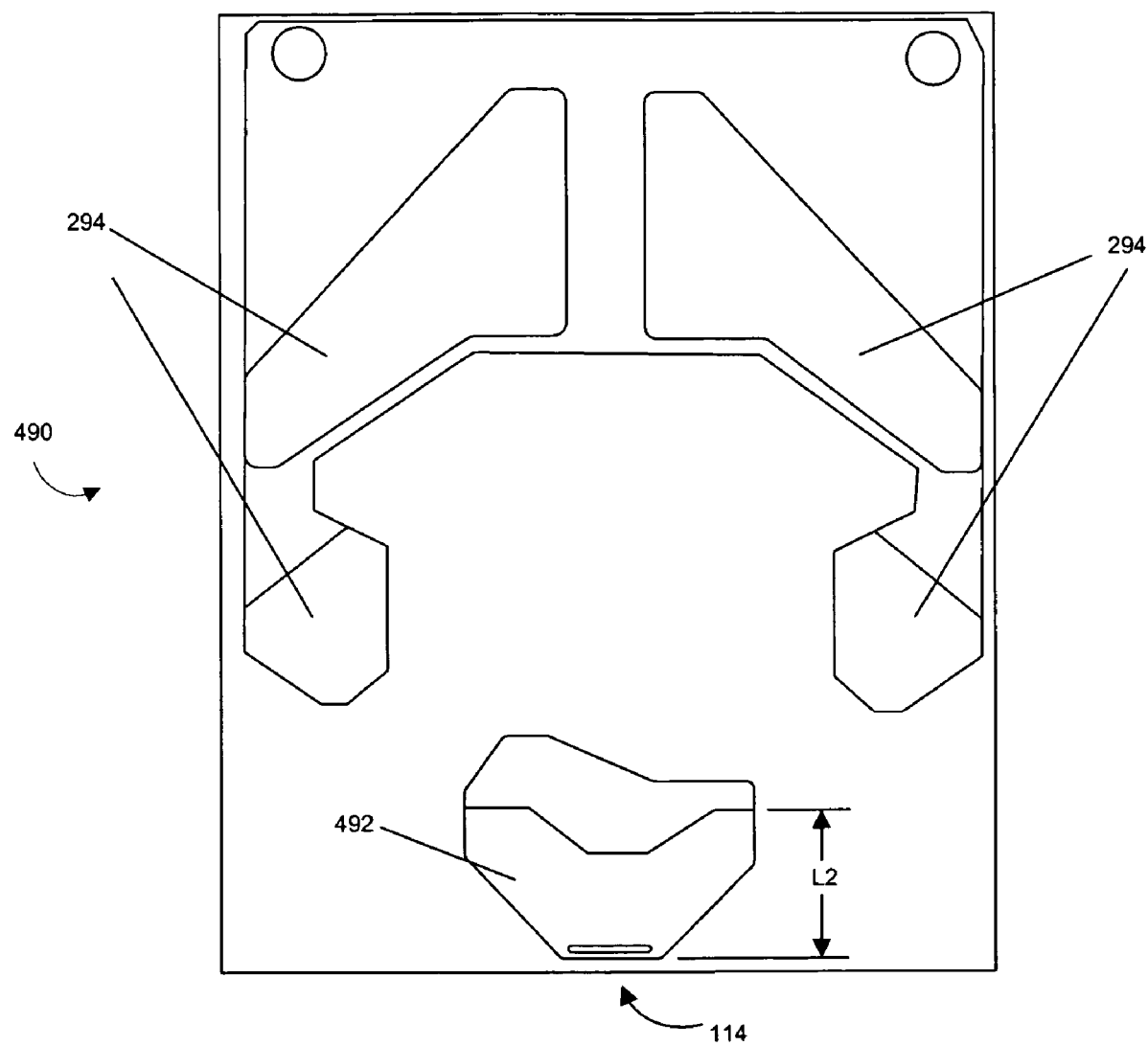
FIG. 9A is an embodiment of an air bearing surface for a slider in accordance with the present invention.

Still further embodiments of systems in accordance with the present invention can include an ABS scheme having a structure such that an HFW transient time is increased. Referring to FIG. 9A, in an embodiment a trailing pad of the ABS 490 can be shaped such that the trailing pad 492 influences the aerodynamics of the ABS 490 to increase flight time. The trailing pad 492 of FIG. 9A can be increased from a first length L1 to a second length L2 so that a portion of the trailing pad 492 is located closer to the leading edge of the slider 228. Such an arrangement can provide a desired increase in HFW transient time. For the example given above, the HFW transient length of 500 microns can be increased to substantially match the space between servo wedges (which could be separated at the OD by anywhere from 500 microns to 1000 microns or even more). In the embodiment specifically illustrated diagrammatically in FIG. 9A, the original trailing pad length can be approximately 273 microns, while the modified trailing pad length can be approximately 400 microns or greater. While such values are approximate values that depend on the arrangement and size of all of the features of the ABS surface, it will be understood that a trailer pad length (or other feature sizing) that can achieve a result defined by applying embodiments of methods in accordance with the present invention can be determined using design schemes known in the art, for example using a proprietary air bearing design program licensed by the Computer Mechanics Laboratory (CML) of the University of California at Berkeley (referred to herein as "ParticleSim"). Such design programs and others can be used as a tool to calculate a final arrangement to achieve a result determined as a step of an embodiment of the method.

Figure 9B:
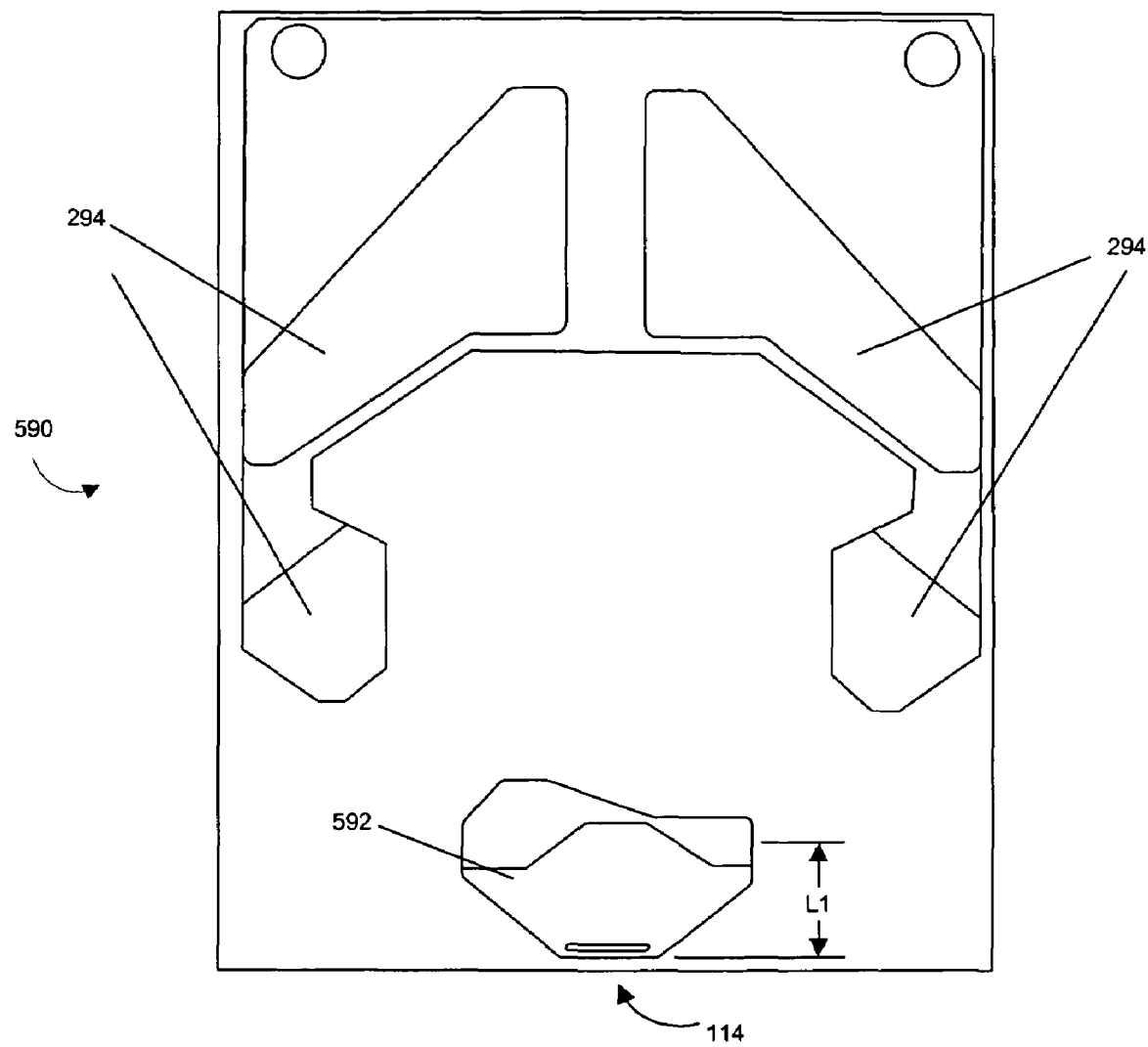
FIG. 9B is an alternative embodiment of an air bearing surface for a slider in accordance with the present invention.
Figure 9C:
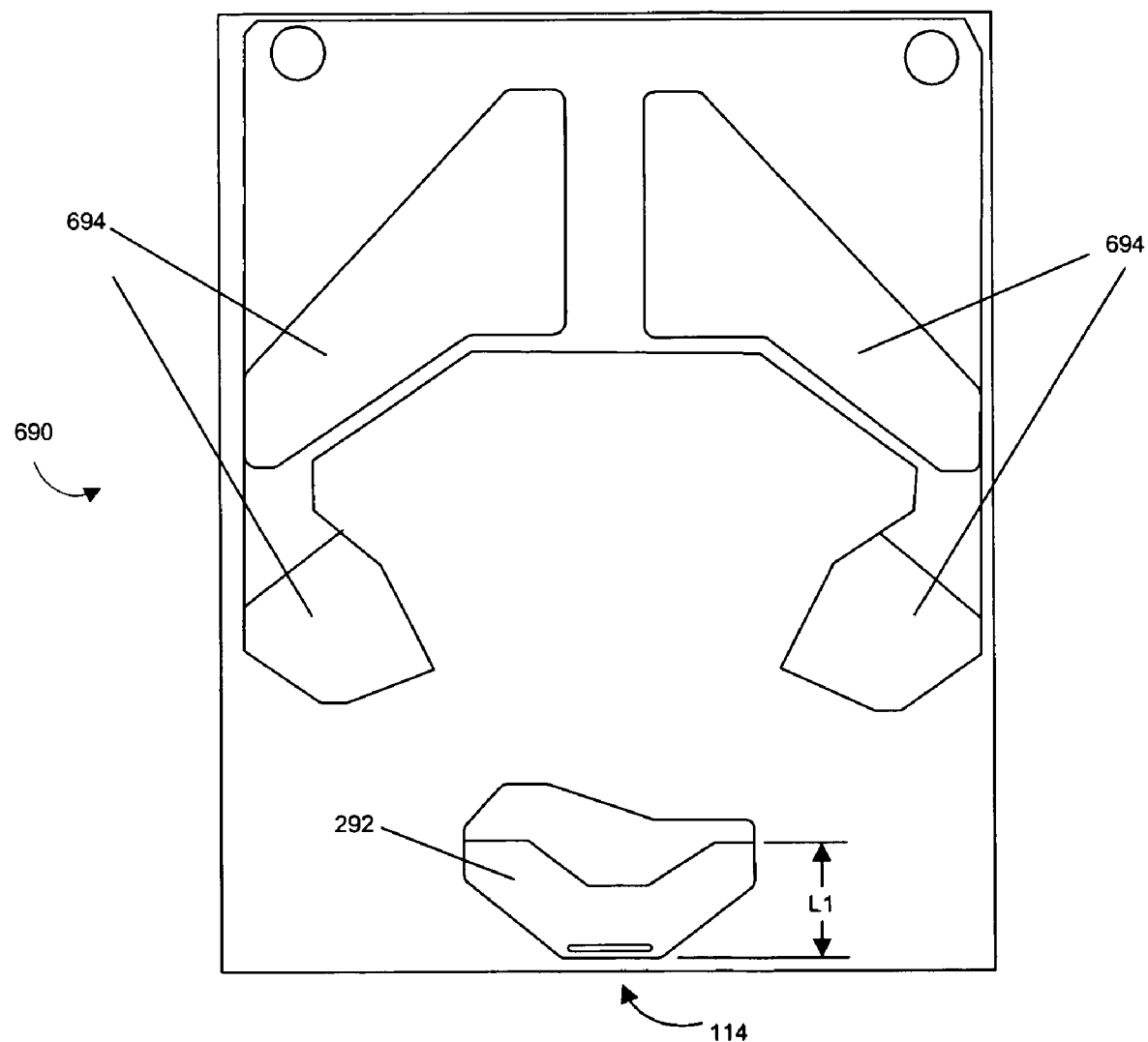
FIG. 9C is a still further embodiment of an air bearing surface for a slider in accordance with the present invention.

In other embodiments of systems in accordance with the present invention, the ABS can be arranged to prevent build up of contamination, thereby avoiding or reducing the probability of an HFW event. Referring to FIG. 9B, in still another embodiment of an ABS 590 of the slider, a leading edge of the trailing pad 592 can be curved convex to a direction of motion, to thereby more readily deflect debris and prevent contamination accumulation. As above, one skilled in the art can use a modeling program such as ParticleSim determine an arrangement of ABS features to cause desired deflecting of debris. Referring to FIG. 9C, in a further embodiment of an ABS 690 of the slider, the leading pad 694 (and/or other ABS features) can be arranged to direct air turbulence toward the trailing pad 292 to prevent accumulation of debris. For example, as shown in FIG. 9C, the leading pads 694 are arranged to so that inner surface of the leading pads 694 funnel the air toward a leading edge of the trailing pad 292. As shown, the inner surface of the leading pads 694 are angled, but could be curved or otherwise shaped such that air is directed toward the trailing pad 292 and/or turbulence is increased. As above, one skilled in the art can use a modeling program such as ParticleSim determine an arrangement of ABS features to direct air toward the trailing pad and/or increase turbulence at the trailing pad.

The foregoing description of preferred embodiments of the present invention has been provided for the purposes of illustration and description. It is not intended to be exhaustive or to limit the invention to the precise forms disclosed. Many modifications and variations will be apparent to one of ordinary skill in the relevant arts. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the claims and their equivalence.

The invention claimed is:

1. A method of detecting a high fly write transient in a hard disk drive having an actuator, a slider operable associated with the actuator, a head associated with the slider, and a rotatable disk, the method comprising:
    arranging one of the slider and a servo pattern of the rotatable disk such that a time over which the head exceeds a threshold head separation during an error event approximates or exceeds a servo wedge sample rate;
    positioning the slider in communicative proximity with the disk;
    rotating the disk such that a head separation forms between the slider and the disk;
    monitoring a signal from a servo wedge; and
    detecting a variance in the signal beyond a threshold.

2. The method of claim 1, wherein the slider is arranged such that a time over which the head exceeds a threshold head separation during an error event approximates or exceeds a servo wedge sample rate by increasing a trailing pad length.

3. The method of claim 1, wherein the servo pattern is arranged such that a time over which the head exceeds a threshold head separation during an error event approximates or exceeds a servo wedge sample rate by approximating a travel distance of the head during the error event and positioning a plurality of servo wedges across the disk based on the travel distance.

4. The method of claim 1, wherein:
the signal from the servo wedge is an AGC reading; and
the variance in the AGC reading beyond the threshold is an AGC reading that exceeds an AGC threshold.

5. The method of claim 1, wherein:
the signal from the servo wedge is a PES burst amplitude; and
the variance in the PES burst amplitude beyond the threshold is an PES burst amplitude that is below a PES burst amplitude threshold.

6. A slider for use in a hard disk drive having an actuator with which the slider is associated, a head associated with the slider, and a rotatable disk having a servo wedge, the slider comprising:
a plurality of features includes a plurality of pads arranged across a surface of the slider and a trailing pad arranged near a trailing edge of the surface of the slider, the plurality of features arranged across a surface of the slider such that head separation is achieved when the slider is positioned over the disk and the disk is rotated such that the slider traverse the servo wedge; and
wherein the plurality of features are arranged such that when the slider traverses debris having a height higher than a minimum height, the head separation increases such that the slider is not in communicative proximity with the disk for a time at least as long as a time for the slider to traverse the servo wedge.

7. The slider of claim 6, wherein the trailing pad is sized so that when the slider traverses debris having a height higher than a minimum height, the head separation increases such that the slider is not in communicative proximity with the disk for a time at least as long as a time for the slider to traverse the servo wedge.

8. A rotatable disk for use in a hard disk drive having an actuator, a slider operably associated with the actuator, and a head associated with the slider, the rotatable disk comprising:
a plurality of servo wedges arranged across a surface of the disk such that an air bearing is formed when the slider is positioned over the disk and the disk is rotated such that the slider traverse the plurality of servo wedges; and
wherein the plurality of servo wedges are arranged across the surface of the disk such that when the slider traverses debris having a height higher than a minimum height, the air bearing increases such that the slider is not in communicative proximity with the disk for a time at least as long as a time for the slider to traverse the servo wedge.

9. A slider for use in a hard disk drive having an actuator with which the slider is associated, a head associated with the slider, and a rotatable disk having a servo wedge, the slider comprising:
a plurality of pads arranged across a surface of the slider so that head separation occurs when the slider is positioned over the disk and the disk is rotated; and
a trailing pad arranged near a trailing edge of the surface of the slider;
wherein one or both of the plurality of pads and the trailing pad are arranged such that debris is deflected away from said trailing pad.

10. The slider of claim 9, wherein the plurality of pads are arranged such that air moving between the pads is channeled toward the trailing pad so that air substantially contacts the trailing pad, thereby agitating the debris accumulated on the trailing pad.

11. The slider of claim 9, wherein the trailing pad has a convex leading edge so that the debris is substantially directed around the trailing pad.

* * * * *

UNITED STATES PATENT AND TRADEMARK OFFICE
CERTIFICATE OF CORRECTION

PATENT NO. : 7,259,931 B2  Page 1 of 1
APPLICATION NO. : 11/108329
DATED : August 21, 2007
INVENTOR(S) : Michael Baldwinson and David Rutherford It is certified that error appears in the above-identified patent and that said Letters Patent is hereby corrected as shown below:

On the title page item (57), line 9
In the Abstract:
After "higher than", insert --a--.

In the Claims:
Claim 1, Col. 10, line 47, after "slider", delete "operable" and insert --operably--.

Signed and Sealed this

Sixth Day of November, 2007

JON W. DUDAS
*Director of the United States Patent and Trademark Office*